US005209766A

United States Patent [19]

Reither

[11] Patent Number: 5,209,766
[45] Date of Patent: May 11, 1993

[54] LABORATORY GAS SCRUBBER

[76] Inventor: Karl Reither, Freiheitsstrasse 45, D-5210 Troisdorf-Spich, Fed. Rep. of Germany

[21] Appl. No.: 814,158

[22] Filed: Dec. 30, 1991

[30] Foreign Application Priority Data

Feb. 8, 1991 [DE] Fed. Rep. of Germany ....... 9101439

[51] Int. Cl.[5] ........................ B01D 47/08; B01D 47/14

[52] U.S. Cl. ........................................ 55/223; 55/229; 55/233; 55/257.1; 55/274

[58] Field of Search .............. 55/223, 229, 233, 257.1, 55/257.2, 274

[56] References Cited

U.S. PATENT DOCUMENTS

| | | | |
|---|---|---|---|
| 1,791,814 | 2/1931 | Hillery | 55/229 X |
| 2,227,465 | 1/1941 | Roche, Jr. et al. | 55/223 X |
| 3,807,143 | 4/1974 | Dunn | 55/229 X |
| 3,815,334 | 6/1974 | Kötting et al. | 55/233 X |
| 4,312,646 | 1/1982 | Fattinger et al. | 55/223 X |
| 4,968,335 | 11/1990 | Fujimoto et al. | 55/233 X |
| 5,011,520 | 4/1991 | Carr et al. | 55/233 X |

FOREIGN PATENT DOCUMENTS

| | | | |
|---|---|---|---|
| 2414318 | 10/1974 | Fed. Rep. of Germany . | |
| 1935665 | 8/1978 | Fed. Rep. of Germany . | |
| 8707001 | 8/1987 | Fed. Rep. of Germany . | |
| 250260 | 10/1987 | Fed. Rep. of Germany . | |
| 8816043 | 5/1989 | Fed. Rep. of Germany . | |
| 3805445 | 8/1989 | Fed. Rep. of Germany . | |
| 55-104629 | 8/1980 | Japan | 55/233 |

*Primary Examiner*—Robert Spitzer
*Attorney, Agent, or Firm*—Diller, Ramik & Wight

[57] ABSTRACT

A laboratory gas scrubber for removing soluble contaminant gases from the exit air from laboratory extractor hoods comprises a cabinet which is assigned to a laboratory extractor hood and is placed close beside the latter to form a closed subassembly and which contains in its lower part a scrubbing liquid tank, an immersion pump immersed in the latter, and a switchbox with the electrical control devices for operating the laboratory gas scrubber, while its upper part contains an inner housing with inlet connectors for the exit air which is emerging from the laboratory extractor hood and is to be purified, and an outlet connector for the purified exit air, and this inner housing contains a packing zone, above this a spraying zone and above this an agglomeration zone. It is possible for two or three laboratory extractor hoods to be arranged beside the laboratory gas scrubber and to be connected to the latter.

8 Claims, 3 Drawing Sheets

LABORATORY GAS SCRUBBER

BACKGROUND OF THE INVENTION

The invention relates to a laboratory gas scrubber for removing soluble contaminant gases from the exit air from laboratory extractor hoods.

The exit air is driven through the zones of the laboratory gas scrubber by a fan which is arranged at a suitable point and is not the subject of the protection.

A laboratory gas scrubber of this kind has already been disclosed by the DE-U 88 16 043 of the same proprietor. This known laboratory gas scrubber is further developed hereby. The object on which the invention is based is to construct the laboratory gas scrubber and arrange its components in such a way that a reduction in the dimensions, especially the height, of the laboratory gas scrubber is made possible, and it can be assigned to a laboratory extractor hood in such a way that it stands directly next to the extractor hood.

SUMMARY OF THE INVENTION

The object is achieved according to the invention by a cabinet which is to be assigned to a laboratory extractor hood and is to be placed close beside the latter to form a closed subassembly and which contains in its lower part a scrubbing liquid tank, an immersion pump immersed in the latter, and a switchbox with the electrical control devices for operating the laboratory gas scrubber, while its upper part contains an inner housing with inlet connectors for the exit air which is emerging from the laboratory extractor hood and is to be purified, and an outlet connector for the purified air, and this inner housing contains a packing zone, above this a spraying zone and above this an agglomeration zone. The design of the abovementioned zones is specifically known. The individual packing items of the packing zone lie on a grating.

The spraying zone contains one or more nozzles which are directed downwards and/or upwards and which are provided with the particular scrubbing liquid which is required via a circulating pump.

The agglomeration zone represents a wide-mesh filter with low pressure drop, in which suspended particles which are carried along and, in particular, finely divided mist of the scrubbing liquid are amalgamated to larger drops.

It is moreover preferably provided that the inlet connector is arranged on the side at the top end of the inner housing and passes through the side wall of the cabinet and is connected inside the inner housing via a duct, which runs downwards, to the inlet side of the packing zone.

Because of the particular design of the laboratory gas scrubber it is also possible to assign two laboratory extractor hoods to it. For this purpose, the laboratory gas scrubber is then provided in the top end of the inner housing with a second inlet connector which passes through the side wall, which is opposite the first inlet connector, of the inner housing and through the side wall, adjacent thereto, of the cabinet to the outside.

However, it is also possible without difficulty for the laboratory gas scrubber according to the invention to be assigned to three laboratory extractor hoods and to serve these, as has been shown in practice.

For this purpose, the laboratory gas scrubber is provided in the top end of the inner housing with a third inlet connector which passes through the roof of the inner housing and the roof, adjacent thereto, of the cabinet upwards and to the outside. Then an appropriately designed pipeline runs from this inlet connector to the outlet opening at the top end of the third laboratory extractor hood.

It is preferable for a viewing window to be provided in the front wall of the inner housing and for an outer viewing window which permits observation through the latter viewing window to be provided in the front wall of the cabinet.

The invention is explained in detail in exemplary embodiments hereinafter by means of the drawing. In this:

DESCRIPTION OF THE PREFERRED EMBODIMENTS

Figure 1:
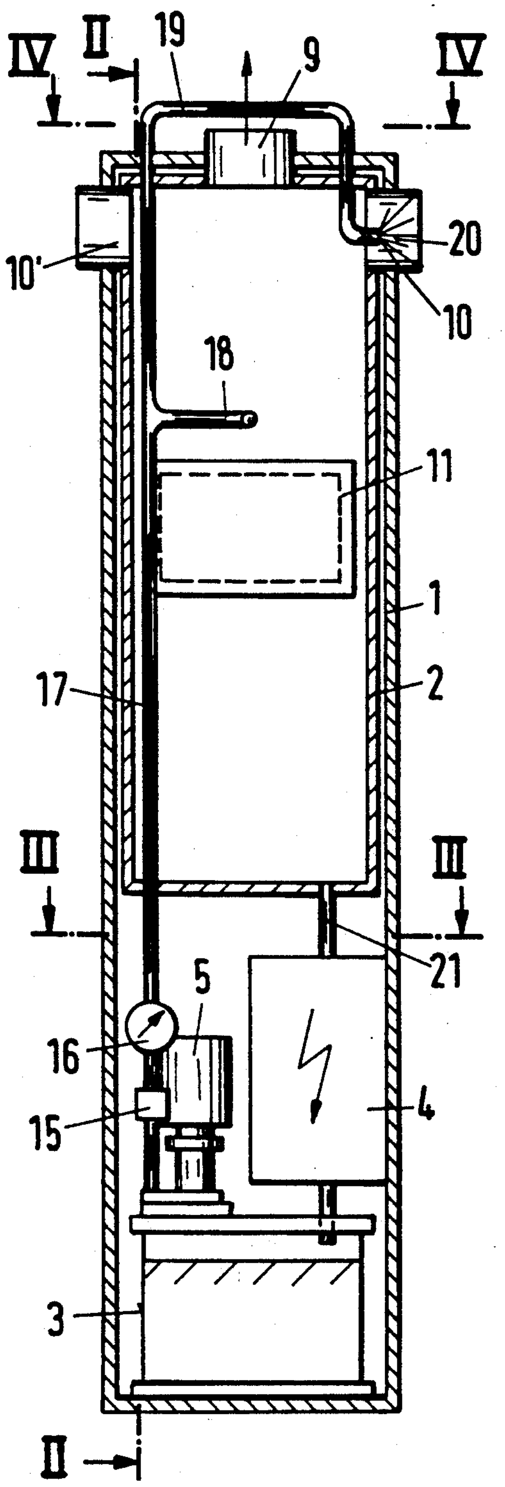
FIG. 1 shows a section through a laboratory gas scrubber according to the invention.
Figure 2:
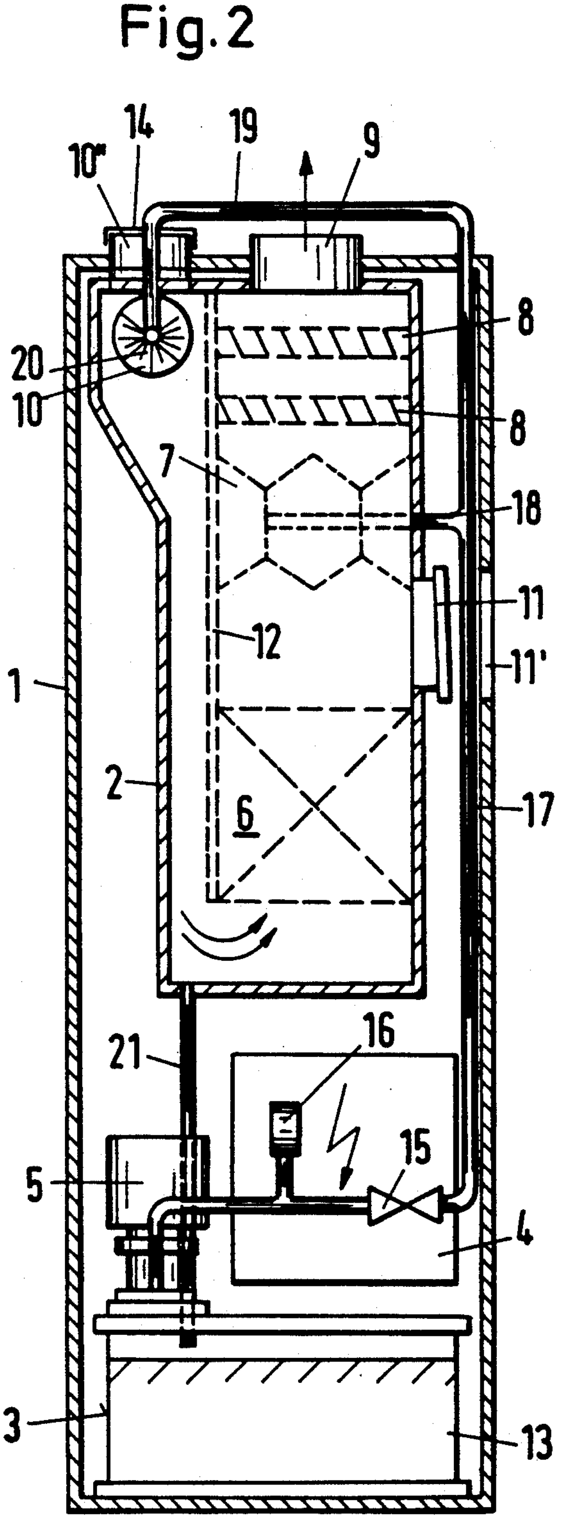
FIG. 2 shows a section along the line II—II in FIG. 1.
Figure 3:
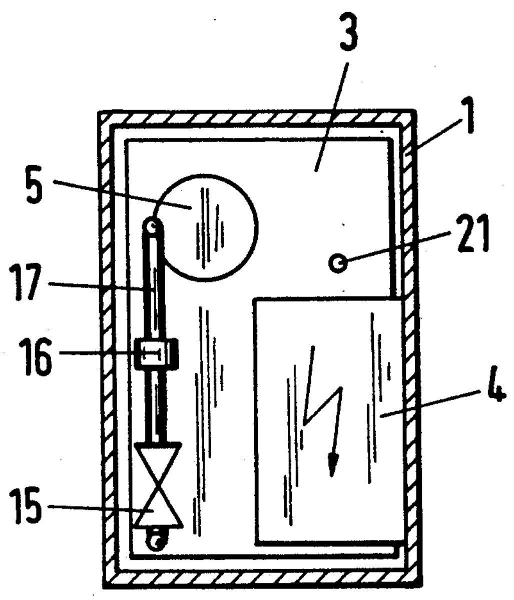
FIG. 3 shows a section along the line III—III in FIG. 1.

The laboratory gas scrubber depicted in FIGS. 1 to 3 contains a cabinet 1 which contains in its lower part a scrubbing liquid tank 3, an immersion pump 5 immersed in the latter, and a switchbox 4 with the electrical control devices for operating the laboratory gas scrubber. An inner housing 2 is located in the upper part of this cabinet and has, arranged on its top end, inlet connectors 10, 10′ and 10″ which serve to connect one or two or three laboratory extractor hoods standing close beside it. If not all three inlet connectors are required, the others are covered with caps. A closure cap 14 of this type is depicted in FIG. 2 on the inlet connector 10″ which is not required there.

The abovementioned inlet connectors each pass through the wall of the cabinet 1.

An outlet connector 9 for the purified exit air is located in the roof at the top end of the inner housing and is connected by an appropriate pipeline via a fan to the chimney for the exit air. This outlet connector likewise passes through the roof of the cabinet 1.

Furthermore, as indicated in FIG. 2, a vertical partition 12 is located in the inner housing 2. The abovementioned inlet connectors 10, 10′ and 10″ at the top end of the inner housing 2 are located on one side of this partition 12 so that the exit air which enters through the inlet connectors and is to be purified is passed along this partition 12 to the lower end of the inner housing 2 and there enters, as is evident from FIG. 2, the packing zone 6 from underneath. From there the exit air initially enters the spraying zone 7 which is supplied with scrubbing liquid through a horizontal pipe 18, and then enters the agglomeration zone 8 and from there enters the outlet connector 9.

A viewing window 11 in the wall of the inner housing at the level between the packing zone and the spraying zone, and a viewing window 11' which is aligned with the latter viewing window, in the cabinet 1 allow the interior of the inner housing to be observed during operation.

The scrubbing liquid 13 required for the spraying zone is contained in the scrubbing liquid tank 3, which has already been mentioned, on the base of the cabinet 1. The suction connector of an immersion pump 5, which is arranged above the scrubbing liquid tank, is immersed in this liquid. The immersion pump sucks scrubbing liquid through a valve 15 into a vertical pipe 17 which supplies the said horizontal pipe 18. The pressure can be monitored by a manometer 16 connected to the pipe.

If perchloric acid in the laboratory extractor hood gets into the exit air, the inlet connectors 10, 10', 10" are sprayed by an additional nozzle 20 in order to prevent the possibility of concentrated perchloric acid or salts thereof collecting inside the suction channels. These nozzles 20, of which one is depicted in FIGS. 1 and 2, are supplied by an additional pipe 19 connected to the vertical pipe 17.

The scrubbing liquid running out of the spraying zone and the nozzles 20 returns through a return line 21, which starts from the base of the inner housing 2, to the scrubbing liquid tank 3.

Also provided are a fresh water supply, an overflow and devices to keep a required pH constant, none of which are depicted.

The switchbox 4 can be taken out of the cabinet for maintenance purposes.

Figure 4:
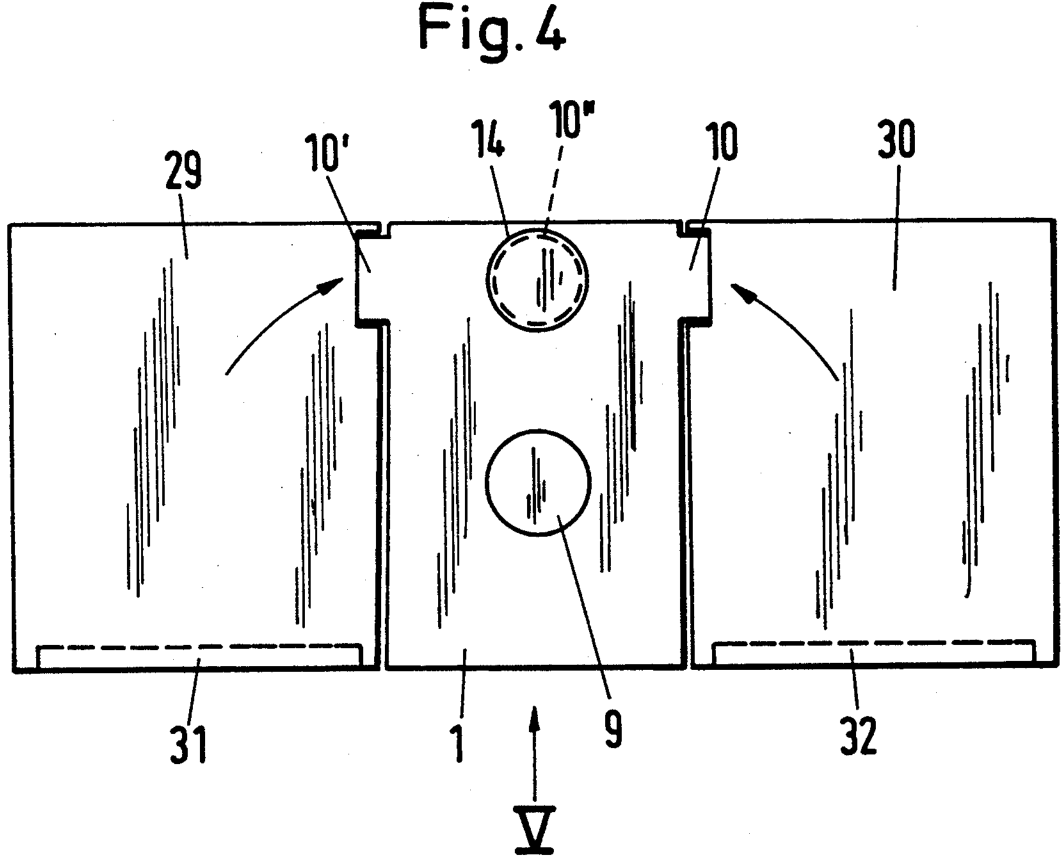
FIG. 4 shows a section along the line IV—IV in FIG. 1, through the laboratory gas scrubber and two laboratory extractor hoods arranged on either side thereof.

As is evident from FIG. 4, two laboratory extractor hoods 29 and 30 with the usual front sliding windows 31 and 32 are located on each side of the laboratory gas scrubber 1, and corresponding openings int which the inlet connectors 10 and 10' of the laboratory gas scrubber enter are located in the rear part at the top end.

Figure 5:
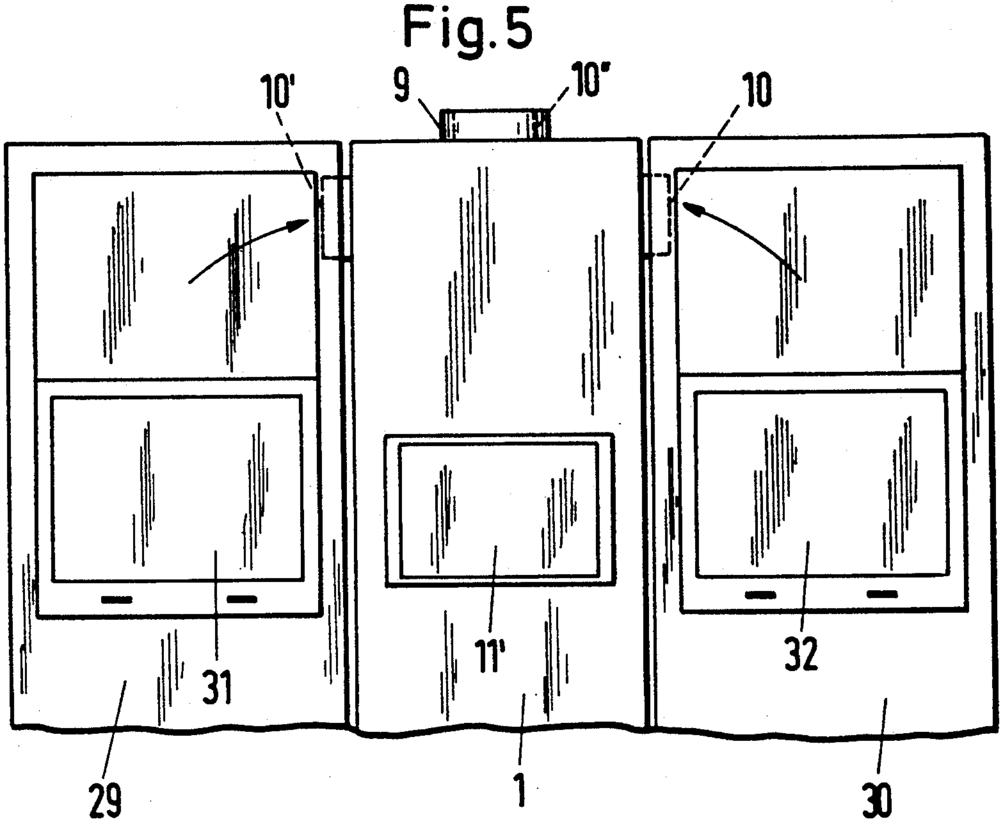
FIG. 5 shows a front view in the direction of the arrow V in FIG. 4.

FIG. 5 shows a front view of this subassembly.

Figure 6:
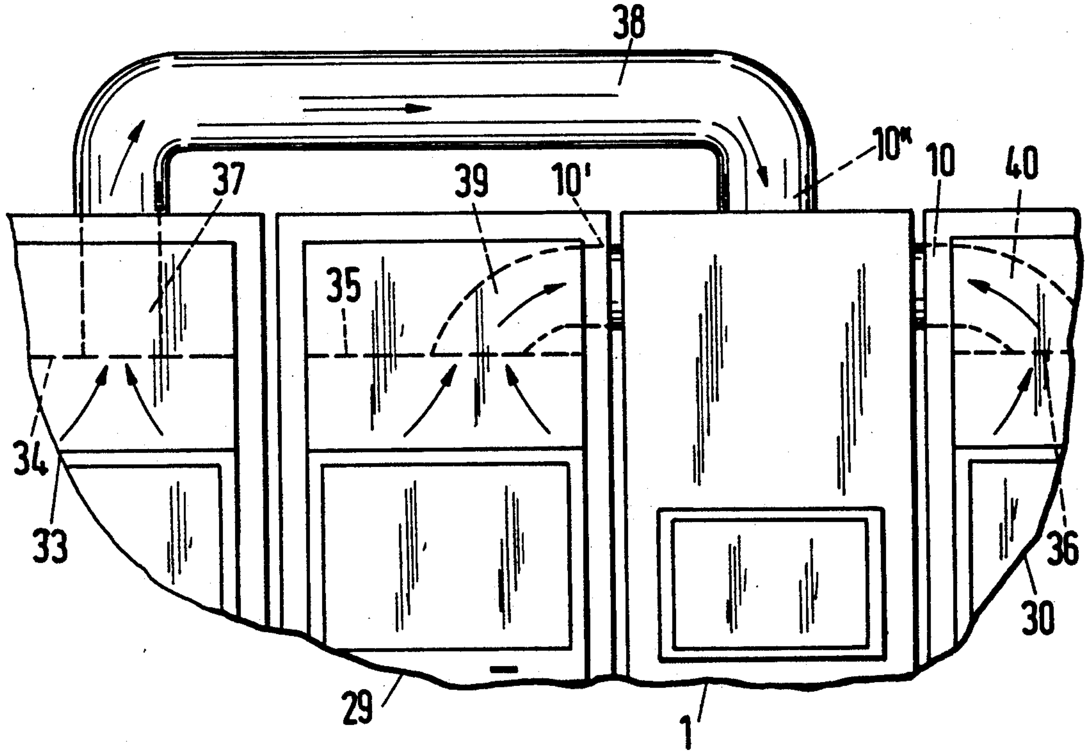
FIG. 6 shows a partly dismantled front view similar to FIG. 5 but with one laboratory gas scrubber and three laboratory extractor hoods connected thereto.

FIG. 6 depicts a laboratory gas scrubber cabinet 1 with two laboratory extractor hoods 29 and 30 located on each side, and a third laboratory extractor hood 33. This third laboratory extractor hood is connected by an upper connector 37 and a connecting pipe 38 to the upper inlet connector 10" of the laboratory gas scrubber.

Horizontal internal partitions 34, 35 and 36 with openings for the exit air are located in the upper part of the three laboratory extractor hoods. These openings are connected by connectors 37, 39 and 40 in the same manner to the laboratory gas scrubber.

List of reference numbers

1 Cabinet for the laboratory gas scrubber
2 Inner housing
3 Scrubbing liquid tank
4 Switchbox
5 Immersion pump
6 Packing zone
7 Spraying zone
8 Agglomeration zone
9 Outlet connector
10]
10'] Inlet connectors
10"]
11]
11'] Viewing windows
12 Partition
13 Scrubbing liquid
14 Closure cap
15 Valve
16 Manometer
17 Vertical pipe
18 Horizontal pipe
19 Additional pipe when operating with perchloric acid
20 Nozzle
21 Return pipe
29 First laboratory extractor hood
30 Second laboratory extractor hood
31]
32] Sliding windows
33 Third laboratory extractor hood
34]
35] Internal partitions
36]
37]
39] Connectors
40]
38 Connecting pipe

I claim:

1. A laboratory gas scrubber for removing soluble contaminant gases from the exhaust air of a laboratory extractor hood comprising a cabinet (1) which is adapted to be used in conjunction with a laboratory extractor hood, said cabinet (1) having upper and lower portions, pump means (5) for pumping scrubbing liquid from a scrubbing liquid tank (3), said pump means (5) and said scrubbing liquid tank (3) being located in said cabinet lower portion, means defining an inner housing (2) in said cabinet upper portion, partition means (12) for defining within said inner housing (2) a first inner housing chamber and a second inner housing chamber, first inlet means (10) for introducing exhaust air emerging from a laboratory extractor hood into said first inner housing chamber which subsequently flows into said second inner housing chamber, outlet means (9) for exhausting air from the second inner housing chamber; said second inner housing chamber including in succession a packing zone (6), a spraying zone (7) and an agglomeration zone (8) with the agglomeration zone (8) being most closely adjacent said outlet means (9) and said packing zone (6) being most remote from said outlet means (9); said agglomeration zone (8) being located generally above said spray zone (7) and said spray zone (7) being located generally above said packing zone (6), means (17, 18) for conducting scrubbing liquid from said scrubbing liquid tank (3) to said spraying zone (7) through and upon energization of said pump means (5), and means for energizing said pump means (5).

2. The laboratory gas scrubber as defined in claim 1 wherein said first inlet means (10) passes through said cabinet upper portion into said first inner housing chamber.

3. The laboratory gas scrubber as defined in claim 2 including a viewing window (11) in a wall of said inner housing (2) generally aligned with a viewing window (11') in a wall of said cabinet (1) through which the interior of said second inner housing chamber can be viewed.

4. The laboratory gas scrubber as defined in claim 1 wherein said first inlet means (1) passes through said cabinet upper portion into said first inner housing chamber, second inlet means (10') for introducing exhaust air emerging from a laboratory extractor hood into said first inner housing chamber which subsequently flows into said second inner housing chamber, and said second inlet means (10') passing through said cabinet upper portion and into said first inner housing chamber generally opposite to said first inlet means (10).

5. The laboratory gas scrubber as defined in claim 4 including a viewing window (11) in a wall of said inner housing (2) generally aligned with a viewing window (11') in a wall of said cabinet (1) through which the interior of said second inner housing chamber can be viewed.

6. The laboratory gas scrubber as defined in claim 1 wherein said first inlet means (10) passes through said cabinet upper portion into said first inner housing chamber, second inlet means (10') for introducing exhaust air emerging from a laboratory extractor hood into said first inner housing chamber which subsequently flows into said second inner housing chamber, said second inlet means (10') passing through said cabinet upper portion and into said first inner housing chamber generally opposite to said first inlet means (10), third inlet means (10") for introducing exhaust air emerging from a laboratory extractor hood into said first inner housing chamber which subsequently flows into said second inner housing chamber, said cabinet upper portion and inner housing having top walls, and said third inlet means (10") effecting exhaust air flow through said top walls from the exterior of said cabinet into said first inner housing chamber.

7. The laboratory gas scrubber as defined in claim 6 including a viewing window (11) in a wall of said inner housing (2) generally aligned with a viewing window (11') in a wall of said cabinet (1) through which the interior of said second inner housing chamber can be viewed.

8. The laboratory gas scrubber as defined in claim 1 including a viewing window (11) in a wall of said inner housing (2) generally aligned with a viewing window (11') in a wall of said cabinet (1) through which the interior of said second inner housing chamber can be viewed.

* * * * *